(12) United States Patent
Warner et al.

(10) Patent No.: US 9,421,874 B2
(45) Date of Patent: Aug. 23, 2016

(54) CONNECTING APPARATUS FOR CONNECTING AN ELECTRICALLY POWERED VEHICLE TO A CHARGING STATION

(71) Applicant: ABB Technology AG, Zurich (CH)

(72) Inventors: Bruce Warner, Aubonne (CH);
Alexandru Dumitru, Geneva (CH);
Philippe Haeberlin, Troinex-GE (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 14/875,184

(22) Filed: Oct. 5, 2015

(65) Prior Publication Data

US 2016/0023564 A1    Jan. 28, 2016

Related U.S. Application Data

(63) Continuation of application No. PCT/EP2014/056948, filed on Apr. 7, 2014, and a continuation of application No. PCT/EP2013/057207, filed on Apr. 5, 2013.

(51) Int. Cl.
*H01M 10/46* (2006.01)
*B60L 11/18* (2006.01)

(52) U.S. Cl.
CPC .......... *B60L 11/1816* (2013.01); *B60L 11/185* (2013.01); *B60L 11/1824* (2013.01); *B60L 11/1833* (2013.01); *B60L 11/1835* (2013.01); *B60L 11/1837* (2013.01);
(Continued)

(58) Field of Classification Search
CPC ..... H02J 7/355; H02J 7/0042; B60L 11/1809; B60L 11/1816; B60L 11/1818
USPC .................. 320/104, 107, 109; 414/281, 282
See application file for complete search history.

(56) References Cited

U.S. PATENT DOCUMENTS

2012/0111682 A1    5/2012    Andre

FOREIGN PATENT DOCUMENTS

| EP | 2345554 A2 | 7/2011 |
|---|---|---|
| EP | 2345554 A3 | 5/2014 |

(Continued)

OTHER PUBLICATIONS

International Preliminary Report on Patentability Application No. PCT/EP2014/056948 Completed: Apr. 9, 2015;Mailing Date: Apr. 9, 2015 8 pages.

(Continued)

*Primary Examiner* — Edward Tso
(74) *Attorney, Agent, or Firm* — Whitmyer IP Group LLC

(57) ABSTRACT

A connecting apparatus for mounting on a vehicle or charging station, providing an electrical connection between the station and vehicle for charging an storage device of the vehicle, comprising: a contacting head for transferring electrical energy; at least one alignment device for coupling the contacting head to a receiver; a detector configured to determine a position of the receiver; and a control unit for aligning the contacting head and receiver; and wherein the alignment device includes a horizontal positioner; a pivoter for pivoting a contacting post carrying the contacting head from a parking position to a substantially vertical position; and a vertical positioner for telescoping the contacting post to adapt its length. The horizontal and vertical positioners, and pivoter performing an alignment movement independent from the others.

30 Claims, 3 Drawing Sheets

(52) U.S. Cl.
CPC ....... *B60L 2200/18* (2013.01); *B60L 2240/622* (2013.01); *B60L 2240/80* (2013.01); *Y02T 10/7005* (2013.01); *Y02T 10/7072* (2013.01); *Y02T 10/7291* (2013.01); *Y02T 90/121* (2013.01); *Y02T 90/125* (2013.01); *Y02T 90/128* (2013.01); *Y02T 90/14* (2013.01); *Y02T 90/16* (2013.01); *Y02T 90/162* (2013.01)

(56) References Cited

FOREIGN PATENT DOCUMENTS

| | | |
|---|---|---|
| FR | 2892069 A1 | 4/2007 |
| JP | 2011167042 A | 8/2011 |
| WO | 2010003021 A2 | 1/2010 |
| WO | 2010003021 A3 | 3/2010 |
| WO | 2011065496 A1 | 6/2011 |
| WO | 2011079215 A2 | 6/2011 |
| WO | 2011099212 A1 | 8/2011 |
| WO | 2011139680 A2 | 11/2011 |
| WO | 2012118422 A1 | 9/2012 |

OTHER PUBLICATIONS

International Search Report and Written Opinion of the International Searching Authority Application No. PCT/EP2013/057207 Completed: Jan. 13, 2014;Mailing Date: Jan. 22, 2014 12 pages.

International Search Report and Written Opinion of the International Searching Authority Application No. PCT/EP2014/056948 Completed: May 30, 2014;Mailing Date: Jun. 18, 2014, 12 pages.

CONNECTING APPARATUS FOR CONNECTING AN ELECTRICALLY POWERED VEHICLE TO A CHARGING STATION

FIELD OF THE INVENTION

The present invention relates to charging systems for connecting electrically powered vehicles to a power feeding station to recharge an electrical energy storage device.

BACKGROUND OF THE INVENTION

Energy for electrically driven vehicles is usually stored in electrical energy storage devices, such as batteries or the like. The batteries need to be recharged regularly to ensure full operation of the electric vehicle. Privately used vehicles, such as cars, are usually operated to drive along a route once and their availability is restored after a sufficient time for recharging.

In contrast, vehicles for public transportation have a much longer operation time. Usually, the electrical energy stored in these vehicles does not provide sufficient capacity to operate public transportation vehicles, such as buses, over the entire operation time. Recharging stops, however, are not acceptable as the public transportation vehicle is filled with people to be commuted according to a bus schedule.

In order to keep the electrical energy storage device of such a vehicle as charged as possible, the brief bus stops for loading or unloading passengers can be used for connection to an electric power source in order to, at least partially, recharge the electrical energy storage device.

For electric buses, solutions found today are based on contacts through one or more divided pantographs or an arrangement of multiple pantographs on the roof of the vehicle or a division of a connecting bar on the wayside.

Furthermore, it would be inconvenient if the driver of the vehicle needed to manually establish a power connection each time the public transportation vehicle stops.

From document WO 2011/079 215 A2 a charging station for electric vehicles is known having connector braces to connect to contact plates or bars on the vehicle. The connector braces may have guiding strips with electrically conductive surfaces which converge such that the convergence is directed toward the electrically conductive surfaces. The alignment of the connector braces to the contact plates or bars on the vehicle is performed when the vehicle enters the charging station, so that the contact plates or bars move into the connector brace which is then aligned by means of the guiding strips.

Document WO 2011/064 596 A2 discloses an electric vehicle charging station having two pantographs arranged along the longitudinal axis of the vehicle to contact to power line bars when the vehicle is in position for recharging.

Document FR 2 802 069 discloses a charging station for an electric vehicle, such as a public bus, wherein an electrical connector to receive electrical power is arranged on the bus. The electrical connector is adapted to contact a corresponding connector on the charging station when the vehicle is in a position to connect the electrical connectors. However, this arrangement requires a relative positioning of the vehicle to the corresponding electrical connector on the charging station, which has to be assured by the driver of the vehicle by stopping the vehicle at a predefined position.

WO 2012/118422 A1 discloses an electrically powered bus with an arm on the rooftop. The pivotal arm is connected pivotable with a collector shoe at the end, which is in contact with the conductor line of a charging station during charging. The conductor line has positioning stops to guide by physical contact the collector shoe to the conductor line. The movement of the arm is a movement on a spherical surface.

US 2012111682A1 discloses a wayside mast with an electrically-supplying arm for charging a bus. The arm has a movable part, which permits to be displaced by pivoting upward if the current collector of the bus gets into physical contact with the movable part. The pivoting movement may be assisted by a motor which can be remote-controlled by a control device.

Hence, there is a need for a fully automatic connecting system for connecting an electrically driven vehicle to a charging station, wherein no active involvement of a driver or any mechanical guidance is required. Furthermore, the requirements for a stop on an exact stop position of the electrically driven vehicle should be low in order to keep the driver's focus on traffic events and the loading and unloading of passengers.

It is therefore an object of the present invention to provide an improved connecting system for establishing an electrical connection with an electrically driven vehicle at a charging station. Furthermore, it is an object of the present invention to ensure that the charging time at each stop of the electrically driven vehicle at a charging station is maximized by providing a quick connection and disconnection.

SUMMARY OF THE INVENTION

This object has been achieved by the connecting apparatus according to the invention, the vehicle, the charging station for an electrically driven vehicle, the charging system, and the method for connecting an electrically driven vehicle.

According to a first aspect, a connecting apparatus for mounting on a rooftop of a vehicle or at a charging station and for providing an electrical connection between the charging station and the vehicle for charging an electrical energy storage device of the vehicle is provided. The connecting apparatus comprises:

a contacting head for connecting to contacting head receiving means for transferring electrical energy;

at least one alignment means for coupling the contacting head to the contacting head receiving means for electrically connecting to or disconnecting from the contacting head receiving means, respectively;

a detector means configured to determine a relative position of the contacting head receiving means to the contacting head; and a control unit for controlling alignment between the contacting head and the contacting head receiving means in response to the determined position of the contacting head receiving means; and wherein the at least one alignment means comprises a horizontal positioning means for laterally moving the contacting head in a horizontal direction;

a pivoting means for pivoting a contacting post carrying the contacting head at one end thereof from a parking position, in which the contacting post is substantially horizontal to a contacting position, in which the contacting post is elevated up to a substantially vertical position; and a vertical positioning means for telescoping the contacting post across the horizontal direction to adapt the length of the contacting post and wherein each of the horizontal positioning means, the pivoting means and the vertical positioning means performing an alignment movement and wherein each of the alignment movements being independent from the others.

One idea of the present invention is to provide a charging system for charging an electrically driven vehicle at a charging station. The electrically driven vehicle or the charging station is provided with a movable contacting head and an alignment unit to operate the contacting head, so that a connecting element of the connecting unit is aligned with and moved to a contacting head receiving means of the charging station or on the vehicle. The alignment unit uses means for detecting the position of the contacting head receiving means without the need of establishing a communication between the charging station and the vehicle. The provision of the alignment unit hence allows for omitting any additional effort of providing communication means between the charging station and the electrically driven vehicle, so that a simplified, quick and robust connection procedure without an exchange of any information can be provided. Providing individual alignment means for an individual alignment by a horizontal, vertical or pivotal movement of the contacting head provides a high flexibility for deviations of the vehicle parking position at charging stops. An automatic recognition of the charging infrastructure and state of the charging process without driver interaction is provided.

Furthermore, adjusting the position of the vehicle in relation to the contacting head receiving means of the charging station is facilitated by means of the alignment unit since the accuracy requirements to stop the vehicle at predetermined exact stopping positions are loosened.

Furthermore, the detector means may be configured to determine the position of the contacting head receiving means as an absolute position in relation to the location of the detector means or as a relative position in relation to the location of the contacting head.

It may be provided that the detector means comprises an optical detector.

The control unit may be coupled with a geo-positioning system to determine whether a charging station is approached, wherein the alignment unit is configured to activate at least one of the at least one positioning means to move the contacting head towards the contacting head receiving means.

According to an embodiment, the control unit may be coupled with a geo-positioning system to determine whether a charging station is approached, wherein the control unit is configured to activate at least one of the at least one alignment means in order to move the contacting head towards the contacting head receiving means.

According to a further aspect, a vehicle is provided which comprises the above connecting apparatus arranged on a vehicle body.

Furthermore, a geo-positioning system may be provided for providing a geographical position information about the geographical position of the vehicle, wherein the alignment unit is configured to determine by comparison with a provided set of charging station positions whether the vehicle approaches a charging station position and, if approaching a charging station position is detected, to activate the alignment unit, in particular to elevate the contacting head to an elevated position.

According to a further aspect, a vehicle comprising electrical driving means is provided. The vehicle comprises a contacting head receiving means having contacting surfaces for being contacted through a contacting head, wherein the contacting head receiving means has a longitudinal contacting rail with a U-shaped cross section.

Furthermore, the contacting surfaces may be arranged in the inner of the U-shaped cross section and extend substantially in parallel along the contacting rail.

An optical marker may be attached at the contacting head receiving means to allow an optical detector to determine the position of the contacting head receiving means.

Particularly, the optical marker may extend in the longitudinal direction of the contacting rail, wherein the optical marker includes two parallel recognizable stripes between which an opening of the U-shaped cross section is arranged.

According to a further aspect, a charging station for supplying electrical energy to a vehicle via a connecting apparatus is provided, wherein a contacting head receiving means is provided having contacting surfaces for contacting a contacting head; wherein the contacting head receiving means has a longitudinal contacting rail with an upside down U-shaped cross section. The contacting head receiving means is further provided with a first earth plate and a second earth plate and wherein the contacting surfaces, the first earth plate and the second earth plate are arranged in the inner of the U-shaped cross section and extend substantially in parallel along the contacting rail. A charging station with this contacting head receiving means configuration has the advantages that the earth connection is made first and disconnected last when coupling or decoupling. An earth resistance measurement may be configured to firstly check the quality (resistance) of the top earth connection and therefore the certainty that the contacting head is fully inserted into the contacting head receiving means. With above configuration a partial insertion or misalignment cannot lead to a situation where a power contact is connect to earth or that the power contacts are inverted.

Moreover, a supply unit may be comprised for detecting whether a contacting head of a vehicle is connected to the contacting head receiving means and for supplying electrical energy to the contacting head receiving means if the electrical connection to the contacting head is detected.

Moreover, in the inner of the U-shaped cross section contacting surfaces may be arranged and extend substantially in parallel along the contacting rail.

According to an embodiment, an optical marker may be attached to the contacting head receiving means to allow the optical detector to determine the position of the contacting head receiving means.

It may be provided that the optical marker extends in the longitudinal direction of the contacting rail, wherein the optical marker includes two parallel recognizable stripes between which an opening of the U-shaped cross section is arranged.

According to a further aspect, a charging station for supplying electrical energy to an electrically driven vehicle, wherein the charging station is provided with the above connecting apparatus.

Moreover, a supply unit may be provided for detecting whether the contacting head is connected to the contacting head receiving means and for supplying electrical energy to the contacting head if the electrical connection with the contacting head receiving means is detected.

According to a further aspect, a charging system comprises the above electrically driven vehicle and the above a charging station.

According to a further aspect, a method for charging an electrical energy storing device of a vehicle is provided, comprising the steps of:

detecting the position of a contacting head receiving means; and positioning a contacting head into the contacting head receiving means by pivot positioning a contacting post which carries a contacting head at one end thereof from a parking position, in which the contacting post is substantially horizontal to a contacting position, in which the contacting post is elevated up to a substantially vertical position, thereafter laterally and vertically positioning the contacting head for transferring electrical energy in response to the determined position of the contacting head receiving means.

The vertical positioning is performed by a means vertical positioning which telescopes the contacting post. The horizontal positioning is performed by a means horizontal positioning means and the vertical positioning is performed by a means vertical positioning means.

Furthermore, the detecting of the position of the contacting head receiving means is performed by recognizing a position of an optical marker at the contacting head receiving means using an optical detector.

It may be detected whether the contacting head is connected to the contacting head receiving means and wherein electrical energy is transferred to the electrical energy storing device if the electrical connection with the contacting head is detected.

According to an embodiment, it may be determined determine whether a charging station is approached, wherein at least one of the at least one alignment means is activated in order to move the contacting head towards the contacting head receiving means before the charging station has been reached.

BRIEF DESCRIPTION OF THE DRAWINGS

Embodiments of the present invention are described in more detail in the following description in conjunction with the accompanying drawings, in which.

DETAILED DESCRIPTION OF THE INVENTION

Figure 1:
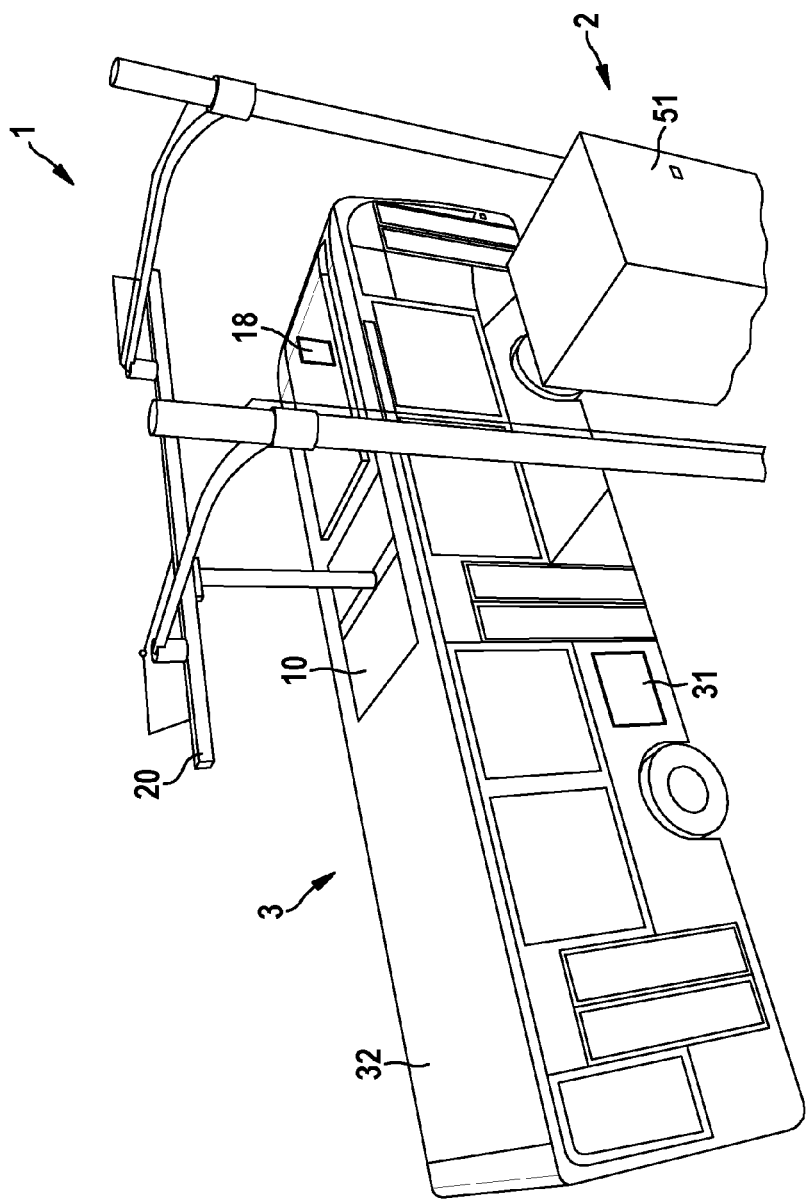
FIG. 1 schematically shows a charging system with a charging station and an electrically driven vehicle.

FIG. 1 shows a charging system 1 including a charging station 2 and a vehicle 3, such as an electrically driven vehicle or a vehicle having electrical driving means, e.g. a bus for public transportation. The charging station 2 is located at one, several or all of the bus stops the electrically driven vehicle 3 is commuting to. In this way, an electrical connection between an electrical energy storage device 31 of the electrically driven vehicle 3 and the charging station 2 is established when the electrically driven vehicle 3 stops at the bus stop.

Before the electrically driven vehicle 3 leaves the bus stop, the electrical connection is disconnected and the electrically driven vehicle 3 is operated using the electrical energy stored in the electrical energy storage device 31.

As the electrically driven vehicle 3 stops at the bus stop only for a few tens of seconds, such as 15 to 30 seconds, it is essential in this configuration that the electrical connection is established as soon as the electrically driven vehicle 3 stops at the bus stop and is disconnected just before the electrically driven vehicle 3 starts moving again in order to leave the bus stop. Furthermore, the establishing of the electrical connection requires that the electrically driven vehicle 3 stops at a fixed position to facilitate alignment of the contacts to be connected to one another.

Figure 2:
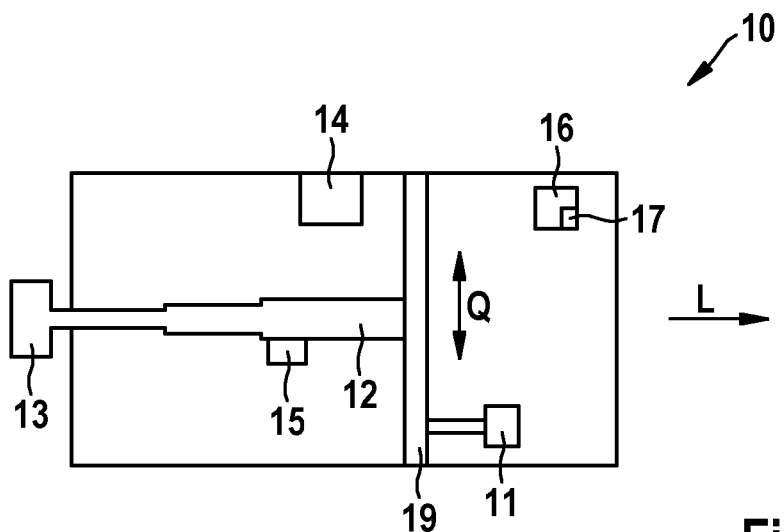
FIG. 2 shows a connecting system being mounted on a rooftop of the electrically driven vehicle.

In particular, the electrically driven vehicle 3 has a connecting arrangement 10 (connecting apparatus), shown in more detail in FIG. 2, which is attached to a rooftop 32 of the electrically driven vehicle 3 and is activated as soon as the electrically driven vehicle 3 approaches the charging station 2. Approaching the charging station 2 can be detected using an automatic positioning detection system, such as GPS, GLONASS and the like, and by comparing, on the one hand, the detected geographical position and the odometer reading of the bus with, on the other hand, predetermined geographical positions of bus stops.

The connecting arrangement 10 has a horizontal positioning means 11 as an alignment means for adjusting the position of a contacting post 12 in a horizontal direction Q, which is substantially perpendicular to a longitudinal axis L of the electrically driven vehicle 3. The movement of a contacting post 12 in a horizontal direction Q can be performed by a mechanical coupling e.g. with a thread rod 19 driven by the horizontal positioning means 11. As an alternative embodiment a tooth belt can provided instead of the thread rod 19 to provide a mechanical coupling for moving the contacting post 12 in the horizontal direction Q. At its lower end, the contacting post 12 has an inner thread engaged with the thread rod, so that a rotation of the thread rod moves the contacting post 12 laterally. Other mechanical implementations for causing the horizontal movement of the contacting post 12 are possible as well.

At its opposite (upper) end, the contacting post 12 carries a contacting head 13 which is adapted to establish connections to a contacting head receiving means 20 of the charging station 2.

Furthermore, the connecting arrangement 10 can comprise a horizontal pivoting means 14 and/or a vertical positioning means 15 as alignment means to adjust the vertical position of the contacting head 13. The pivoting means 14 allows for pivoting the contacting post 12 from a parking position, in which the contacting post 12 is substantially horizontal, i. e. in parallel to the plane of the rooftop 32, to a contacting position, in which the contacting post 12 is elevated up to a substantially vertical position. The mechanical implementation can make use of any means which are capable of lifting the contacting post 12, thus pivoting it around the thread rod 19.

The vertical positioning means 15 may allow for adapting the height of the contacting post 12 by telescoping. The contacting post 12 may include two or more telescoping elements configured to slide into each other, so that the length of the contacting post 12 can be controlled and the vertical position of the contacting head 13 (distance from the thread rod 19) can be set.

In general, the horizontal positioning means 11 and the first and second vertical alignment means 14, 15 can be actuated by individual means of an electrical, pneumatic, or hydraulic actuators, respectively. This gives a high flexibility to adjust the contacting head to the charging infrastructure in particular for buses which perform a kneeling movement before passengers entering or leaving the bus and to provide a coarse approach of the contacting head if approaching the charging point.

Furthermore, a control unit 16 is provided which is in contact with the horizontal positioning means 11 and the pivoting and vertical positioning means 14, 15 to control the movement and alignment of the contacting head 13. Moreover, the control unit 16 may be configured to detect an absolute position of the contacting head receiving means 20 which provides electrical energy supplied by the charging station for recharging the electrical energy storage device 31 of the electrically driven vehicle 3. The control unit 16 may be further configured to detect the relative position of the contacting head receiving means 20 in relation to the position of the contacting head 13. Once the control unit 16 has detected the absolute or relative position, the control unit 16 controls the horizontal positioning means 11 and the pivoting and vertical positioning means 14, 15 so that the contacting head 13 is moved horizontally and vertically into the contacting head receiving means 20.

Figure 3:
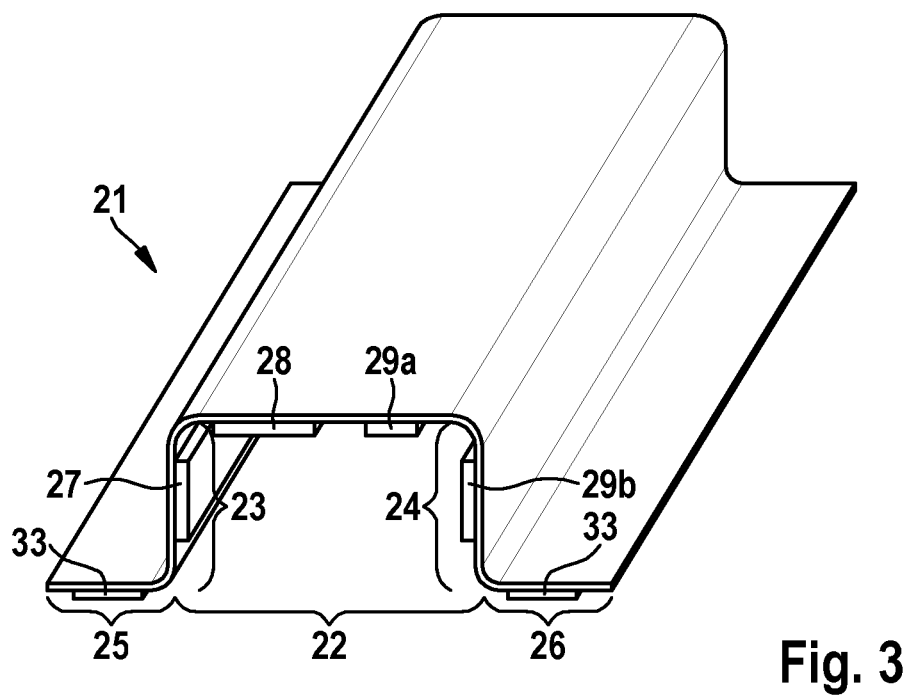
FIG. 3 shows a cross-sectional view through a feeding means of the charging station.

The contacting head receiving means 20 substantially includes a contacting rail 21 extending into the longitudinal direction L. As shown in FIG. 3, the contacting rail 21 has a cross section of an upside down U-shape. The U-shaped contacting rail 21 has a base portion 22, a first leg portion 23 and a second leg portion 24. At the ends of the first and second leg portions 23, 24 and opposite to the base portion 22, first and second extensions 25, 26 are provided which extend laterally away from one another, i.e. substantially in parallel to the base portion 22.

The inner surface of the contacting rail 21 is provided with contacting surfaces 27, 28. In the shown embodiment, a first contacting plate 27 is provided at an inner side of the first leg portion 23 and a second contacting plate 28 is provided at an inner side of the base portion 22 of the contacting rail 21. Also provided at the inner side of the base portion 22 of the contacting rail 21 and adjacent to as well as extending substantially in parallel to the second contacting plate 28, a first earth plate 29a is provided. At the inner side of the second leg portion 24, a second earth plate 29b is provided. The first contacting plate 27 and the second contacting plate 28, the first earth plate 29a and the second earth plate 29b substantially extend in parallel to the extension of the contacting rail 21. This allows for the contacting head 13 to contact the contacting surfaces 27, 28, and the contacting plates 29a, 29b at any position along the contacting rail 21.

Figure 4:
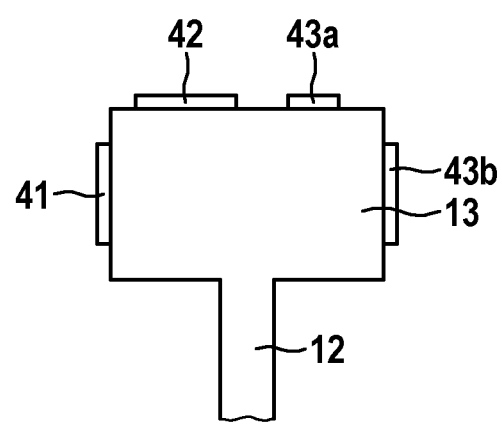
FIG. 4 shows a cross-sectional view through a contacting head of a connecting arrangement.

The contacting head 13 is constructed accordingly, as shown in FIG. 4. The contacting head 13 at the end of the contacting post 12 has a first side contact 41 and a second side contact 42 as well as a first earth contact 43a and a second earth contact 43b, so that when the contacting head 13 enters the inner area of the U-shaped contacting rail 21, the contacts 41, 42, 43a, 43b contact the first and second contacting surfaces 27, 28 and the first and second earth plates 29a, 29b, respectively.

This configuration has the advantages that the earth connection is made first and disconnected last when coupling or decoupling. Furthermore, an earth resistance measurement may be configured to firstly check the quality (resistance) of the top earth connection and therefore the certainty that the head is fully inserted. With above configuration a partial insertion or misalignment can not lead to a situation where a power contact is connect to earth or that the power contacts are inverted.

According to another embodiment, instead of the upside down U-shaped contacting rail 12 the contacting rail could also be orientated so that it has a form similar to a C in cross section and connection to contacting rail 12 would occur horizontally, i.e. from the side. This might require a substantial L-shaped contacting rod where the contacting head extends laterally from the contacting rod.

The control unit 16 is capable of detecting an absolute position of the contacting rail 21 and/or a relative position of the contacting rail 21 with respect to the contacting head 13. So, firstly a horizontal alignment of the contacting head 13 and subsequently a vertical alignment of the contacting head 13 can be carried out in order to insert the contacting head 13 into the U-shape of the contacting rail 21, so that, as soon as the bus has stopped close to the charging station 2, a connection between the electrically driven vehicle 3 and the charging station 2 can be established.

The control unit 16 may include an optical detector 17 as a detecting means which searches for a target element or pattern indicating the exact position of the contacting rail 21. In the present embodiment, the target element may comprise two optically recognizable stripes 33, such as fluorescent stripes, on the lower downwardly facing side of the extension 25, 26 of the contacting rail 21, so that it can be recognized by the optical detector 17 arranged at the control unit 16 on the rooftop 32 of the electrically driven vehicle 3. The two stripes 33 are detectable by the optical detector 17 and clearly indicate the position of the inner space of the U-shaped contacting rail 21 as the space between the stripes 33, so that the contacting head 13 can easily be moved and positioned into the contacting rail 21.

Apart from the control unit 16 using the optical detector 17, other detector means can also be used which allow for detecting a position of the contacting head receiving means 20 and the contacting rail 21. It is preferred that the positioning at the contacting rail 21 or the contacting head receiving means 20 is performed without any additional means, so that a robust and simple positioning system can be implemented. Other detecting means might include proximity sensors, radar sensors and the like. However, visually guided alignment means that are based on laser or a camera system are easy to implement as they only require optical markers at the contacting head receiving means 20, if any.

The vehicle 3 can be equipped with a geo-positioning system 18 which provides geographical position information about the geographical position of the vehicle 3. The control unit 16 can be configured to receive the geographical position information and to determine by comparison with a provided set of bus stop positions (charging station positions) whether the bus approaches a bus stop. If approaching a bus stop is detected, the control unit 16 can be activated and a lifting of the contacting head 13 to an elevated position between the rooftop 32 and the contacting head receiving means 20 can be commanded in order to shorten time for establishing a contact to the contacting head receiving means 20. The geo-positioning system 18 can be included in the connecting apparatus as well.

On the side of the charging station 2, a supply unit 51 is provided which controls the supply of charging power to the contacting rail 21.

In order to trigger the supply unit 51 to supply the charging power, a test current may be passed from the electrically driven vehicle 3 through the first and second earth plates 29a, 29b functioning as earth contacts, and which are interconnected in the charging station 2, and the current and voltage drops of the bridged earth contacts are measured to give the contact resistance. The test current is also sensed at the side of the charging station 2 to find out whether a connection at the contacting rail 21 is established. It may be provided that the supply of electrical power to the contacting rail 21 is activated only in case the test current is detected.

As soon as the contact resistance between the electrically driven vehicle 3 and the charging station 2 becomes too high, which is the case when the control unit 16 controls the horizontal positioning means 11 and/or the pivoting and vertical positioning means 14, 15 to remove the contacting head 13 from the contacting rail 21, the charging process is stopped and the primary circuit is isolated.

According to another embodiment, a charging system may include a charging station and an electrically driven vehicle 3 where the connecting arrangement 10 with the above described configurations may be provided at the charging station and which serves to feed electricity to the vehicle, while the contacting rail 21 which may have the above described configurations, may be attached to the vehicle to be connected by the contacting head. The movement to align the contacting head towards the contacting head receiving means is then be carried out by the connecting apparatus mounted on the charging station.

According to a further embodiment also two connecting arrangements can be provided on the vehicle and the charging station which are moved towards each other to establish a connection. In this case one of the connecting arrangements is provided with a contacting rail instead of the contact head.

What is claimed is:

1. A connecting apparatus for mounting on a rooftop of a vehicle or at a charging station and for providing an electrical connection between the charging station and the vehicle for charging an electrical energy storage device of the vehicle, the connecting apparatus comprising:
    a contacting head for connecting to contacting head receiving means for transferring electrical energy;
    at least one alignment means for coupling the contacting head to the contacting head receiving means for electrically connecting to or disconnecting from the contacting head receiving means, respectively;
    a detector means configured to determine a position of the contacting head receiving means; and
    a control unit for controlling alignment between the contacting head and the contacting head receiving means in response to the determined position of the contacting head receiving means; characterized in that,
    the at least one alignment means comprises a horizontal positioning means for laterally moving the contacting head in a horizontal direction;
    a pivoting means for pivoting a contacting post carrying the contacting head at one end thereof from a parking position, in which the contacting post is substantially horizontal to a contacting position, in which the contacting post is elevated up to a vertical position; and
    a vertical positioning means by telescoping the contacting post across the horizontal direction to adapt the length of the contacting post;
    wherein each of the horizontal positioning means, the pivoting means and the vertical positioning means performing an alignment movement and wherein each of the alignment movement being independent from the others.

2. The connecting apparatus according claim 1, wherein the detector means is configured to determine the position of the contacting head receiving means as an absolute position in relation to the location of the detector means or as a relative position in relation to the location of the contacting head.

3. The connecting apparatus according to claim 1, wherein the detector means comprises an optical detector.

4. The connecting apparatus according to claim 1, wherein the horizontal positioning means, the pivoting means and vertical positioning means are actuated by individual electrical, pneumatic, or hydraulic actuators.

5. The connecting apparatus according to claim 1, wherein the control unit is coupled with a geo-positioning system to determine whether a charging station is approached, wherein the control unit is configured to activate at least one of the at least one alignment means in order to move the contacting head towards the contacting head receiving means.

6. The connecting apparatus according to claim 1, wherein the contacting head has a first side contact and a second side contact as well as a first earth contact and a second earth contact.

7. The connecting apparatus according to claim 1, wherein the at least one alignment means is a visually guided alignment means.

8. The connecting apparatus according to claim 7, wherein the visually guided alignment means is based on a laser.

9. The connecting apparatus according to claim 1, wherein the contacting post include two or more telescoping elements configured to slide into each other.

10. The charging station for supplying electrical energy to a vehicle, wherein the charging station is provided with a connecting apparatus according to claim 1.

11. The charging station according to claim 10, further comprising a supply unit for detecting whether the contacting head is connected to the contacting head receiving means and for supplying electrical energy to the contacting head if the electrical connection with the contacting head receiving means is detected.

12. A method for charging an electrical energy storing device of a vehicle using a connecting apparatus according to claim 1, comprising the steps of:
    detecting the position of a contacting head receiving means; and
    positioning a contacting head into the contacting head receiving means, by
    pivot positioning a contacting post carrying a contacting head at one end thereof from a parking position, in which the contacting post is substantially horizontal to a contacting position, in which the contacting post is elevated up to a vertical position, thereafter
    horizontally positioning the contacting head and
    vertically positioning the contacting head for transferring electrical energy in response to the determined position of the contacting head receiving means.

13. The method according to claim 12, wherein the detecting position of the contacting head receiving means is performed by recognizing a position of an optical marker at the contacting head receiving means using an optical detector.

14. The method according to claim 12, wherein it is detected whether the contacting head is connected to the contacting head receiving means and wherein electrical energy is transferred to the electrical energy storing device if the electrical connection with the contacting head is detected.

15. The method according to claim 14, wherein the detection whether the contacting head is connected to the contacting head receiving means is made by establishing an earth connection between a first and second earth plate of a contacting rail of the contacting head receiving means to a first and second earth contact of the contacting head and performing an earth resistance measurement between the earth plates and the earth contacts.

16. The method according to claim 14, wherein electrical energy is transferred to the electrical energy storing device by establishing an electrical connection between a first and second contacting plate of the contacting rail to a first and second side contact of the contacting head.

17. The method according to claim 12, wherein it is determined determine whether a charging station is approached, wherein at least one of the at least one alignment means is activated in order to move the contacting head towards the contacting head receiving means before the charging station has been reached.

18. A vehicle including electrical driving means comprising:

a connecting apparatus arranged on a vehicle body having
a contacting head for connecting to contacting head receiving means for transferring electrical energy;
at least one alignment means for coupling the contacting head to the contacting head receiving means for electrically connecting to or disconnecting from the contacting head receiving means, respectively;
a detector means configured to determine a position of the contacting head receiving means; and
a control unit for controlling alignment between the contacting head and the contacting head receiving means in response to the determined position of the contacting head receiving means; characterized in that,
the at least one alignment means comprises a horizontal positioning means for laterally moving the contacting head in a horizontal direction;
a pivoting means for pivoting a contacting post carrying the contacting head at one end thereof from a parking position, in which the contacting post is substantially horizontal to a contacting position, in which the contacting post is elevated up to a vertical position; and
a vertical positioning means by telescoping the contacting post across the horizontal direction to adapt the length of the contacting post;
wherein each of the horizontal positioning means, the pivoting means and the vertical positioning means performing an alignment movement and wherein each of the alignment movement being independent from the others.

19. The vehicle according to claim 18, wherein a geopositioning system is provided for providing a geographical position information about the geographical position of the vehicle, wherein the control unit is configured to determine by comparison with a provided set of charging station positions whether the vehicle approaches a charging station position and, if approaching of a charging station position is detected, to activate the control unit, in particular to elevate the contacting head to an elevated position.

20. The vehicle according to claim 18, comprising: a contacting head receiving means having contacting surfaces for being contacted through a contacting head, wherein the contacting head receiving means has a longitudinal contacting rail with a U-shaped cross section.

21. The vehicle according to claim 20, wherein the contacting surfaces are arranged in the inner of the U-shaped cross section and extend substantially in parallel along the contacting rail.

22. The vehicle according to claim 21, wherein an optical marker is attached at the contacting head receiving means to allow an optical detector to determine the position of the contacting head receiving means.

23. The vehicle according to claim 22, wherein the optical marker extends in the longitudinal direction of the contacting rail, wherein the optical marker includes two parallel recognizable stripes between which an opening of the U-shaped cross section is arranged.

24. A charging station for supplying electrical energy to a vehicle via a connecting apparatus, wherein a contacting head receiving means is provided having contacting surfaces for contacting a contacting head; wherein the contacting head receiving means has a longitudinal contacting rail with an U-shaped cross section, characterized in that, the contacting head receiving means is further provided with a first earth plate and a second earth plate and wherein the contacting surfaces, the first earth plate and the second earth plate are arranged in the inner of the U-shaped cross section and extend substantially in parallel along the contacting rail.

25. The charging station according to claim 24, further comprising a supply unit for detecting whether a contacting head is connected to the contacting head receiving means and for supplying electrical energy to the contacting head receiving means if the electrical connection with the contacting head is detected.

26. The charging station according to claim 24, wherein the contacting surface is provided at an inner side of a first leg portion of the contacting rail, wherein the contacting surface and the first earth plate are provided at an inner side of a base portion of the contacting rail and wherein the second earth plate is provided at an inner side of a second leg portion of the contacting rail.

27. The charging station according to claim 26, wherein an optical marker is attached to the contacting head receiving means to allow an optical detector to determine the position of the contacting head receiving means.

28. The charging station according to claim 27, wherein the optical marker extends in the longitudinal direction of the contacting rail, wherein the optical marker includes two parallel recognizable stripes between which an opening of the U-shaped cross section is arranged.

29. A charging system comprising a vehicle having
a contacting head for connecting to containing head receiving means for transferring electrical energy;
at least one alignment means for coupling the contacting head to the contacting head receiving means for electrically connecting to or disconnecting from the contacting head receiving means, respectively;
a detector means configured to determine a position of the contacting head receiving means;
a control unit for controlling alignment between the contacting head and the contacting head receiving means in response to the determined position of the contacting head receiving means; characterized in that,
the at least one alignment means comprises a horizontal positioning means for laterally moving the contacting head in a horizontal direction;
a pivoting means for pivoting a contacting post carrying the contacting head at one end thereof from a parking position, in which the contacting post is substantially horizontal to a contacting position, in which the contacting post is elevated up to a vertical position;
a vertical positioning means by telescoping the contacting post across the horizontal direction to adapt the length of the contacting post;
wherein each of the horizontal positioning means, the pivoting means and the vertical positioning means performing an alignment movement and wherein each of the alignment movement being independent from the others;
wherein the contacting head has a first side contact and a second side contact as well as a first earth contact and a second earth contact; and
a charging station supplying electrical energy to a vehicle via a connecting apparatus,
wherein a contacting head receiving means is provided having contacting surfaces for contacting a contacting head;
wherein the contacting head receiving means has a longitudinal contacting rail with an U-shaped cross section;
wherein the contacting head receiving means is further provided with a first earth plate and a second earth plate; and
wherein the contacting surfaces, the first earth plate and the second earth plate are arranged in the inner of the U-shaped cross section and extend substantially in parallel along the contacting rail.

30. A charging system, comprising:

a vehicle having a contacting head for connecting to contacting head receiving means for transferring electrical enemy;

at least one alignment means for coupling the contacting head to the contacting head receiving means for electrically connecting to or disconnecting from the contacting head receiving means, respectively;

a detector means configured to determine a position of the contacting head receiving means;

a control unit for controlling alignment between the contacting head and the contacting head receiving means in response to the determined position of the contacting head receiving means;

wherein the at least one alignment means comprises a horizontal positioning means for laterally moving the contacting head in a horizontal direction;

a pivoting means for pivoting a contacting post carrying the contacting head at one end thereof from a parking position, in which the contacting post is substantially horizontal to a contacting position, in which the contacting post is elevated up to a vertical position;

a vertical positioning means by telescoping the contacting post across the horizontal direction to adapt the length of the contacting post; and wherein each of the horizontal positioning means, the pivoting means and the vertical positioning means performing an alignment movement and wherein each of the alignment movement being independent from the others; and a charging station for supplying electrical energy to a vehicle via a connecting apparatus wherein a contacting head receiving means is provided having contacting surfaces for contacting a contacting head;

wherein the contacting head receiving means has a longitudinal contacting rail with an U-shaped cross section;

wherein the contacting head receiving means is further provided with a first earth plate and a second earth plate; and wherein the contacting surfaces, the first earth plate and the second earth plate are arranged in the inner of the U-shaped cross section and extend substantially in parallel along the contacting rail.

* * * * *